United States Patent
Li et al.

(10) Patent No.: US 12,278,560 B2
(45) Date of Patent: Apr. 15, 2025

(54) ELECTROMAGNETIC INTERFERENCE MITIGATION FOR ELECTRIC VEHICLE CHARGERS

(71) Applicant: Rivian IP Holdings, LLC, Irvine, CA (US)

(72) Inventors: Ming Li, Torrance, CA (US); Lixiang Wei, Irvine, CA (US); Steven Schulz, Torrance, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 530 days.

(21) Appl. No.: 17/830,815

(22) Filed: Jun. 2, 2022

(65) Prior Publication Data

US 2023/0396157 A1 Dec. 7, 2023

(51) Int. Cl.
*H02M 1/44* (2007.01)
*B60L 53/22* (2019.01)
*H02J 7/02* (2016.01)

(52) U.S. Cl.
CPC ............. *H02M 1/44* (2013.01); *B60L 53/22* (2019.02); *H02J 7/02* (2013.01); *H02J 2207/20* (2020.01)

(58) Field of Classification Search
CPC .......... H02M 1/44; H02M 1/007; H02M 1/32; H02M 1/4216; H02M 3/285; H02M 7/487; H02M 3/33573; B60L 53/22; B60L 2210/10; B60L 2210/30; B60L 53/11; B60L 53/30; B60L 53/67; B60L 2270/147; H02J 7/02; H02J 2207/20; H02J 2310/48; Y02T 10/70; Y02T 10/7072
USPC ....................................... 320/109
See application file for complete search history.

(56) References Cited

U.S. PATENT DOCUMENTS

2019/0148973 A1* 5/2019 Kim ................. B60L 53/22
320/109

\* cited by examiner

*Primary Examiner* — Paul Dinh
(74) *Attorney, Agent, or Firm* — Foley & Lardner LLP

(57) ABSTRACT

Methods and systems for mitigating EMI for electric vehicle chargers are disclosed. In some embodiments, the system comprises a power cabinet comprising a first PEM for charging a first electric vehicle and a second PEM for charging the first vehicle or a second electric vehicle. The first PEM and second PEM may be switched at different frequencies. In some embodiments, a difference between a first frequency of the first PEM and a second frequency of the second PEM is greater than a noise sampling frequency.

20 Claims, 5 Drawing Sheets

ELECTROMAGNETIC INTERFERENCE MITIGATION FOR ELECTRIC VEHICLE CHARGERS

INTRODUCTION

A power system (e.g., power cabinet) for charging an electric vehicle may comprise a plurality of power electronics modules (PEM). The PEMs may comprise crystal oscillators configured to generate clock signals at a same frequency for operating the PEMs. Due to mismatches between the crystal oscillators, the actual clock signal frequencies may differ between PEMs. In some instances, mismatched clock signals of a multi-PEM system may generate electromagnetic interference (EMI). In some instances, the EMI may not be averaged and reduced, causing operational and compliance issues for the power cabinet.

BRIEF SUMMARY

Methods and systems for mitigating EMI for electric vehicle chargers are disclosed. In some embodiments, the system comprises a power cabinet comprising a first PEM for charging a first electric vehicle and a second PEM for charging the first vehicle or a second electric vehicle. The first PEM and second PEM may be switched at different frequencies. In some embodiments, a difference between a first frequency of the first PEM and a second frequency of the second PEM is greater than a noise sampling frequency, such that EMI generated by signals operating the PEMs may be averaged and reduced.

The embodiments disclosed above are examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Methods and systems for mitigating EMI for electric vehicle chargers are disclosed. In some embodiments, the system comprises a power cabinet comprising a first PEM for charging a first electric vehicle and a second PEM for charging the first vehicle or a second electric vehicle (e.g., DC fast charging). The first PEM and second PEM may be switched at different frequencies. In some embodiments, a difference between a first frequency of the first PEM and a second frequency of the second PEM is greater than a noise sampling frequency (e.g., 10 Hz). The disclosed systems and methods advantageously allow EMI generated by the PEM signals (e.g., conduction emission) to be averaged and reduced while minimizing costs for mitigating the EMI (e.g., no additional hardware may be required to mitigate the EMI, PEM redesign may not be required, additional EMI filter design may not be required).

By allowing the EMI to be averaged and reduced, power cabinet operational issues affecting high power delivery to an electric vehicle (e.g., resonance in the power cabinet, higher ripple current, higher and unstable conductive emission from 150 kHz-30 MHz) may be mitigated, and nearby devices susceptible to EMI at applicable bandwidths would be less affected. Furthermore, the disclosed methods allow the power cabinet to be compliant to interference requirements (e.g., FCC Class A).

Although examples of the disclosure are described with respect to electric vehicle chargers, it is appreciated that the disclosed methods may be performed for power converters for other applications.

Figure 1:
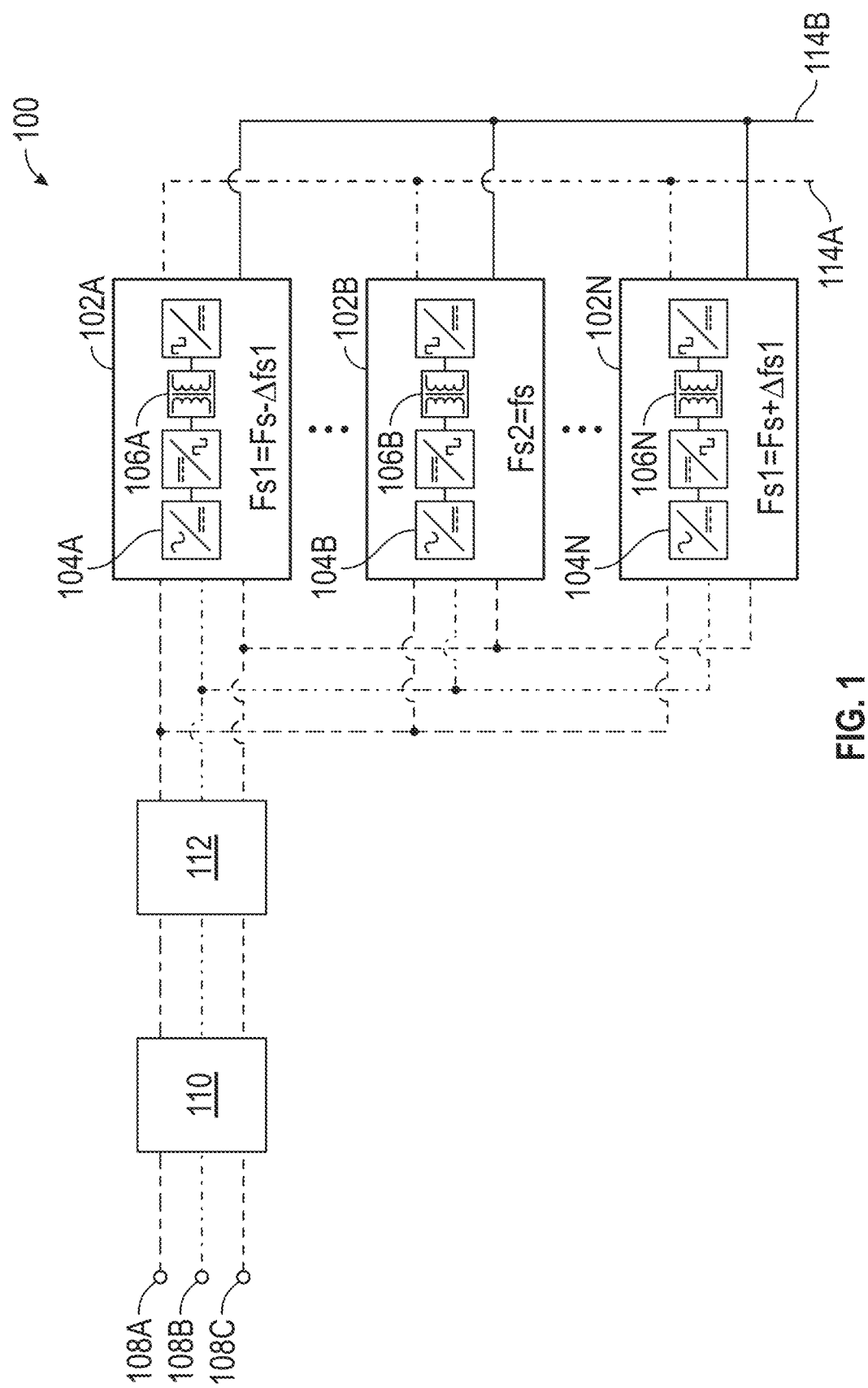
FIG. 1 illustrates an overview of an example system for charging an electric vehicle.

FIG. 1 illustrates an overview of an example system for charging an electric vehicle. In some embodiments, the system comprises a power cabinet 100, which comprises PEMs 102A-102N, power inputs 108A-108C, circuit breaker 110, EMI filter 112, and power outputs 114A-114B. In some embodiments, each of the PEM 102A-102N comprises an AC-DC converter 104A-104N and a DC-DC converter 106A-106N.

In some embodiments, the power cabinet 100 is configured to receive a 480 V alternating current (AC) voltage (e.g., via power inputs 108A-108C). It is understood that the input voltage value is exemplary. The power cabinet 100 may be configured to receive other input voltage values (e.g., 600 V). In some embodiments, the circuit breaker 110 is configured to decouple the power cabinet from an external voltage source (e.g., to protect the PEMs from inrush current, to de-energize the system (e.g., in event of a fault, during field service)). In some embodiments, the EMI filter 112 is configured to attenuate EMI coupled to the power inputs 108A-108C and prevent the EMI from entering the PEMs. In some embodiments, the power cabinet 100 is configured to provide a maximum power of 300 kW.

PEM 102A is switched at frequency Fs1, PEM 102B is switched at frequency fs, and PEM 102N is switched at frequency FsN. In some embodiments, Fs1 is Δfs1 less than fs, and FsN is ΔfsN greater than fs, where Δfs1 is a frequency difference associated with PEM 102A relative to PEM 102B, and ΔfsN is a frequency difference associated with PEM 102 N relative to PEM 102B. In some embodiments, the power cabinet 106 comprises six PEMs, and each PEM is switched at a respective frequency different from each other, as disclosed herein. In some embodiments, the absolute difference between the clock frequency and the second frequency is 3-times greater than the noise sampling frequency (e.g., absolute value of Δfs1 is 3-5 times fs, absolute value of ΔfsN is 3-5 times fs). In some embodiments, the absolute difference between the clock frequency and the second frequency being 3-5 times greater than the noise sampling frequency allows noise fluctuations to average out during one noise sampling period. In some embodiments, the absolute difference between the clock frequency and the second frequency is up to 20 times greater than the noise sampling frequency.

In some embodiments, the power cabinet 100 is configured to receive a first signal switching at a clock frequency, and the first signal is generated via an oscillator, such as a crystal oscillator (e.g., the clock frequency is generated based on a nominal frequency of the crystal oscillator (e.g., a microcontroller setting the clock frequency based on the nominal frequency)). For example, the clock frequency is fs. In some embodiments, fs is 50 kHz. In some embodiments, fs is between 10 kHz and 200 kHz. In some embodiments, the first signal generated via a crystal oscillator of the power cabinet 100 drives the PEM 102B directly. In some embodiments, the first signal generated via the crystal oscillator is used to derive a signal (e.g., by buffering the first signal) for operating the PEM 102B at fs.

In some embodiments, the first PEM is configured to be switched at the clock frequency to provide a first DC voltage for charging a first electric vehicle. For example, the PEM 102B is configured to be switched at fs (e.g., for switching DC-DC converter 106B), and the PEM 102B is configured to provide a DC voltage to a first power dispenser for charging a first electric vehicle. In some embodiments, the PEMs 106A-106N are configured to output a voltage between 200 V and 1000 V.

In some embodiments, the power cabinet 100 is configured to generate a second signal switching at a second frequency. For example, the power cabinet 100 is configured to generate a second signal switching at Fs1 for operating PEM 102A. As another example, the power cabinet 100 is configured to generate a second signal switching at FsN for operating 102N.

In some embodiments, the second PEM is configured to be switched at the second frequency to provide a second DC voltage for charging the first vehicle (e.g., working in parallel with the first PEM) or a second electric vehicle. For example, the PEM 102A is configured to be switched at Fs1 (e.g., for switching DC-DC converter 106A), and the PEM 102A is configured to provide a DC voltage to a second power dispenser for charging the first vehicle or a second electric vehicle. As another example, the PEM 102N is configured to be switched at FsN (e.g., for switching DC-DC converter 106N), and the PEM 102N is configured to provide a DC voltage to a third power dispenser for charging a third electric vehicle.

In some embodiments, the AC-DC converters 104A-104N comprise a Vienna rectifier. For example, AC-DC converter 104A of PEM 102A comprises a Vienna rectifier, and the Vienna rectifier is switched at Fs1. In some embodiments, the DC-DC converters 106A-106N comprise a dual active bridge converter. For example, DC-DC converter 106A of PEM 102A comprises a dual active bridge converter, and the dual active bridge converter is switched at Fs1. In some embodiments, an AC-DC converter and a DC-DC converter of a PEM are electrically coupled together. For example, AC-DC converter 104A of PEM 102A is electrically coupled to DC-DC converter 106A of PEM 102A, and the AC-DC converter and DC-DC converter are switched at Fs1.

In some embodiments, each of the PEMs 102A-102N comprises a crystal oscillator. For example, the PEM 102A comprises a second crystal oscillator (e.g., different from the crystal oscillator of PEM 102B that is configured to generate the first signal switching the clock frequency). In some embodiments, the second crystal oscillator is configured to generate a third signal switching at a second clock frequency different from the first clock frequency. In some embodiments, an absolute difference between the first and second clock frequencies is not greater than the noise sampling frequency. For example, the absolute difference between fs and the second clock frequency (of the second crystal oscillator) is not greater than 10 Hz (e.g., noise sampling frequency).

In some embodiments, the power cabinet 100 is configured to forgo generating the third signal (e.g., a signal at a frequency associated with the second crystal oscillator). As discussed in more detail herein, the disclosed systems and methods advantageously allow EMI generated by the clock signals of the PEMs (e.g., conduction emission) to be averaged and reduced while minimizing costs for mitigating the EMI (e.g., no additional hardware may be required to mitigate the EMI, PEM redesign may not be required, additional EMI filter design may not be required). Because the absolute difference between fs and the second clock frequency (of the second crystal oscillator) is not greater than the noise sampling frequency, generation of the third signal at the second clock frequency may be forgone (e.g., to avoid generating EMI that may not be averaged). By forgoing generating the third signal, the plurality of PEMs 102A-102N may comprise a same PEM (e.g., each PEM comprises a crystal oscillator, but one of the crystal oscillator is used), reducing cost of designing and manufacturing different PEMs.

Figure 2:
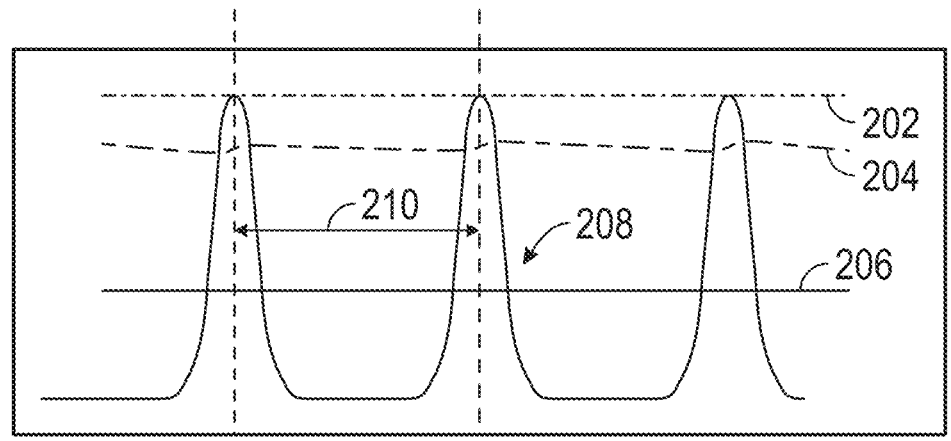
FIG. 2 illustrates example waveforms of a system for charging an electric vehicle.

In some embodiments, the absolute difference between the clock frequency (e.g., fs) and the second frequency (e.g., Fs1, FsN) is greater than a noise sampling frequency (e.g., 10 Hz, a frequency of a conduction emission average measurement). In some embodiments, an absolute difference between any two PEMs is greater than the noise sampling frequency (e.g., 10 Hz). As discussed, if an absolute difference between operating frequencies of two PEMs is not greater than 10 Hz, some EMI (e.g., conduction emission) may not be averaged (e.g., the sampled noise fluctuates beyond a tolerance) and reduced. FIG. 2 describes the advantages of the disclosed systems and methods in more detail with respect to the noise sampling frequency.

In some embodiments, Fs1 is determined based on detection of presence of the PEMs in operation. For example, at a first time, Fs1 is determined based on detection of the presence of PEMs 102A and 102B in operation (e.g., PEM 102N is not in operation, PEM 102N has not been added to the power cabinet 100). In some embodiments, the power cabinet 100 is configured to receive an indication of a presence of a PEM in the power cabinet. For example, at a second time, the power cabinet 100 detects the presence of PEM 102N (e.g., corresponding to FsN) in operation (e.g., PEM 102N is now operation, PEM 102N has been added to the power cabinet 100). In response to receiving the indication, the power cabinet 100 is configured to update the second signal to switch at a third frequency. In some embodiments, the third frequency (e.g., an updated value of Fs1) is different than the second frequency (e.g., a previous value of Fs1), and an absolute difference between the clock frequency and the third frequency is greater than the noise sampling frequency. For example, Fs1 is updated to a different frequency, and Fs1 is updated such that absolute difference between Fs1, fs, and FsN are greater than the noise sampling frequency (e.g., Fs1 is updated such that the introduction of FsN allow EMI between PEMs 102A, 102B, and 102N to be mitigated as disclosed herein). In some embodiments, the second frequencies Fs1 and/or FsN are determined based on a noise reduction parameter (e.g., based on an EMI requirement of the system).

FIG. 2 illustrates example waveforms 200 of a system for charging an electric vehicle. In some embodiments, the waveforms 200 comprises a peak signal 202, a quasi-peak signal 204, average signal 206, and EMI signal 208. In some embodiments, the EMI signal 208 is an EMI signal generated by a first PEM and a second PEM. For example, the EMI signal 208 is generated by the PEMs 102A and 102B (e.g., constructive interference between PEMs connected in parallel). In some embodiments, the EMI signal 208 has a frequency at slip frequency fslip (corresponding to EMI signal period 210), which may be the frequency difference between the two PEM signals. In some embodiments, the average signal 206 is an average of the EMI signal 208 sampled at the noise sampling frequency (e.g., 10 Hz, a frequency of a conduction emission average measurement).

In some embodiments, the absolute difference between the clock frequency (e.g., fs) and the second frequency (e.g., Fs1, FsN) is greater than a noise sampling frequency (e.g., 10 Hz, a frequency of a conduction emission average measurement). In some embodiments, an absolute difference between any two PEMs is greater than the noise sampling frequency (e.g., 10 Hz). If an absolute difference between operating frequencies of two PEMs is greater than the noise sampling frequency, the slip frequency is greater than the noise sampling frequency, and EMI signal 208 may be averaged and reduced. For example, the absolute difference between fs and Fs1 is the slip frequency, and the slip frequency is greater than the noise sampling frequency of 10 Hz.

By operating PEM 102A at Fs1 and PEM 102B at fs, the EMI signal 208 may be averaged because a larger number of samples of the EMI noise 208 may be obtained and an average of the samples may converge within a range. That is, the average signal 206 may be within a noise fluctuation threshold (e.g., the peak signal 202). In some embodiments, the noise fluctuation threshold is 6-10 dB. For example, the average signal 206 are constant.

By operating PEM 102A at Fs1 and PEM 102B at fs and generating EMI signal 208 having an average value (e.g., average signal 206) within a noise fluctuation threshold, characteristics of the EMI signal may be known to the power cabinet (with a degree of certainty) and the EMI signal may be reduced based on these characteristics (e.g., by offsetting by an average value (e.g., obtained via sampling the EMI) contributed by the EMI). In some embodiments, the EMI is measured prior to charging an electric vehicle (e.g., measured offline). In some embodiments, the EMI is measured concurrently while charging the electric vehicle.

By allowing the EMI to be averaged and reduced, power cabinet operational issues affecting high power delivery to an electric vehicle (e.g., resonance in the power cabinet, higher ripple current, higher and unstable conductive emission from 150 kHz-30 MHz) may be mitigated, and nearby devices susceptible to EMI at applicable bandwidths would be less affected. Furthermore, the disclosed methods allow the power cabinet to be compliant to interference requirements (e.g., FCC Class A).

In contrast, if the frequency of EMI signal 208 were not greater than the noise sampling frequency, the average signal 206 may not be within a noise fluctuation threshold. The EMI may not be mitigated as described above, causing power cabinet operational issues and failure to pass interference requirements.

Figure 3:
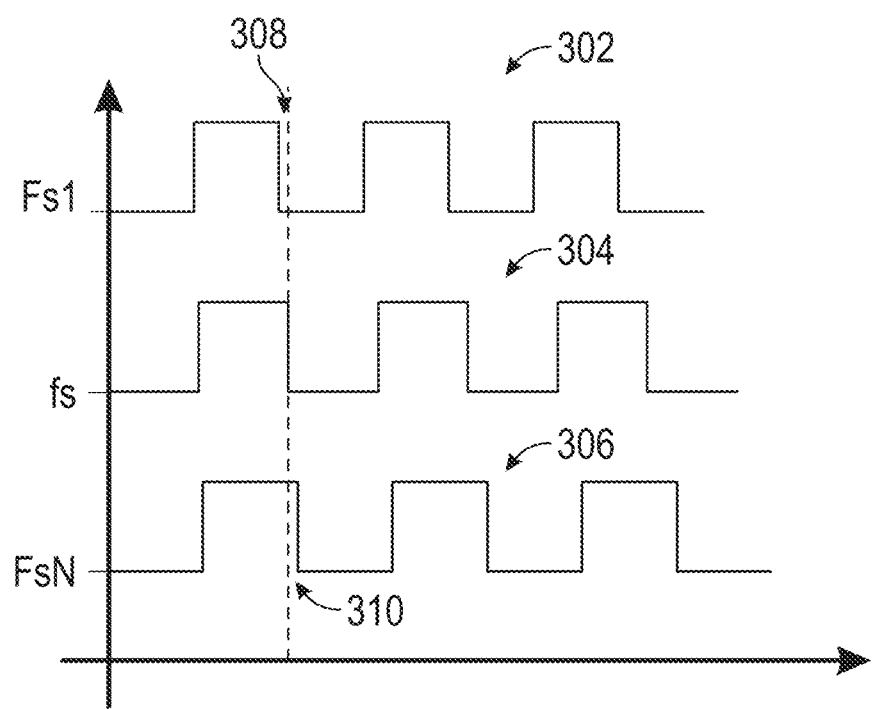
FIG. 3 illustrates example waveforms of a system for charging an electric vehicle.

FIG. 3 illustrates example waveforms 300 of a system for charging an electric vehicle. In some embodiments, the waveforms 300 comprise waveforms of signals operating PEMs of a power cabinet. For example, second signal waveform 302 is a second signal for operating the PEM 102A frequency Fs1, first signal waveform 304 corresponds a clock signal (e.g., based on an output of a crystal oscillator) and is a first signal for operating the PEM 102B at frequency fs, and third signal waveform 306 is a third signal for operating the PEM 102N at frequency FsN. In some embodiments, the first, second, and third signal comprise a duty cycle of 0.5.

In some embodiments, difference 308 is a period difference between waveform 302 and 304. For example, difference 308 is a period difference that corresponds to $\Delta$fs1. In some embodiments, difference 310 is a period difference between waveform 304 and 306. For example, difference 310 is a period difference that corresponds to $\Delta$fsN.

In some embodiments, the second signal (e.g., corresponding to waveform 302) and the third signal (e.g., corresponding to waveform 306) are generated based on the first signal (e.g., corresponding to waveform 304). In some embodiments, an absolute difference between the clock frequency and the third frequency is an integer multiple of the absolute difference between the clock frequency and the second frequency. In some embodiments, $\Delta$fs1 and $\Delta$fsN are greater than a noise sampling frequency. For example, the noise sampling frequency is 10 Hz, and $\Delta$fs1 and $\Delta$fsN are 200 Hz. As another example, $\Delta$fs1 and $\Delta$fsN are integer multiples of each other (e.g., $\Delta$fs1 is 200 Hz, and $\Delta$fsN is 600 Hz).

In some embodiments, Fs1 and FsN are in a range from a lower frequency bound to an upper frequency bound, and the center of the lower and upper frequency bounds is fs. For example, fs is 50 kHz, and Fs1 and FsN are between lower bound 49.4 kHz and upper bound 50.6 kHz, such that differences between Fs1, FsN, and fs are greater than a noise sampling frequency. As a specific example, fs is 50 kHz, Fs1 may be 49.4 kHz, 49.6 kHz or 49.8 kHz, and FsN may be 50.2 kHz, kHz, or 50.6 kHz. In some embodiments, $\Delta$fs1 and $\Delta$fsN are at least a threshold percentage of fs. For example, $\Delta$fs1 and $\Delta$fsN are at least 0.4% of 50 kHz.

In some embodiments, power cabinet 100 comprises six PEMs. fs may be 50 kHz for operating PEM 102B. Fs1 may be 49.6 kHz for operating PEM 102A. Fs2 may be 49.8 kHz for operating PEM 102B. Fs4 may be 50.2 kHz for operating PEM 102D. Fs5 may be 50.4 kHz for operating PEM 102E. Fs6 may be 50.6 kHz for operating PEM 102F.

Figure 4:
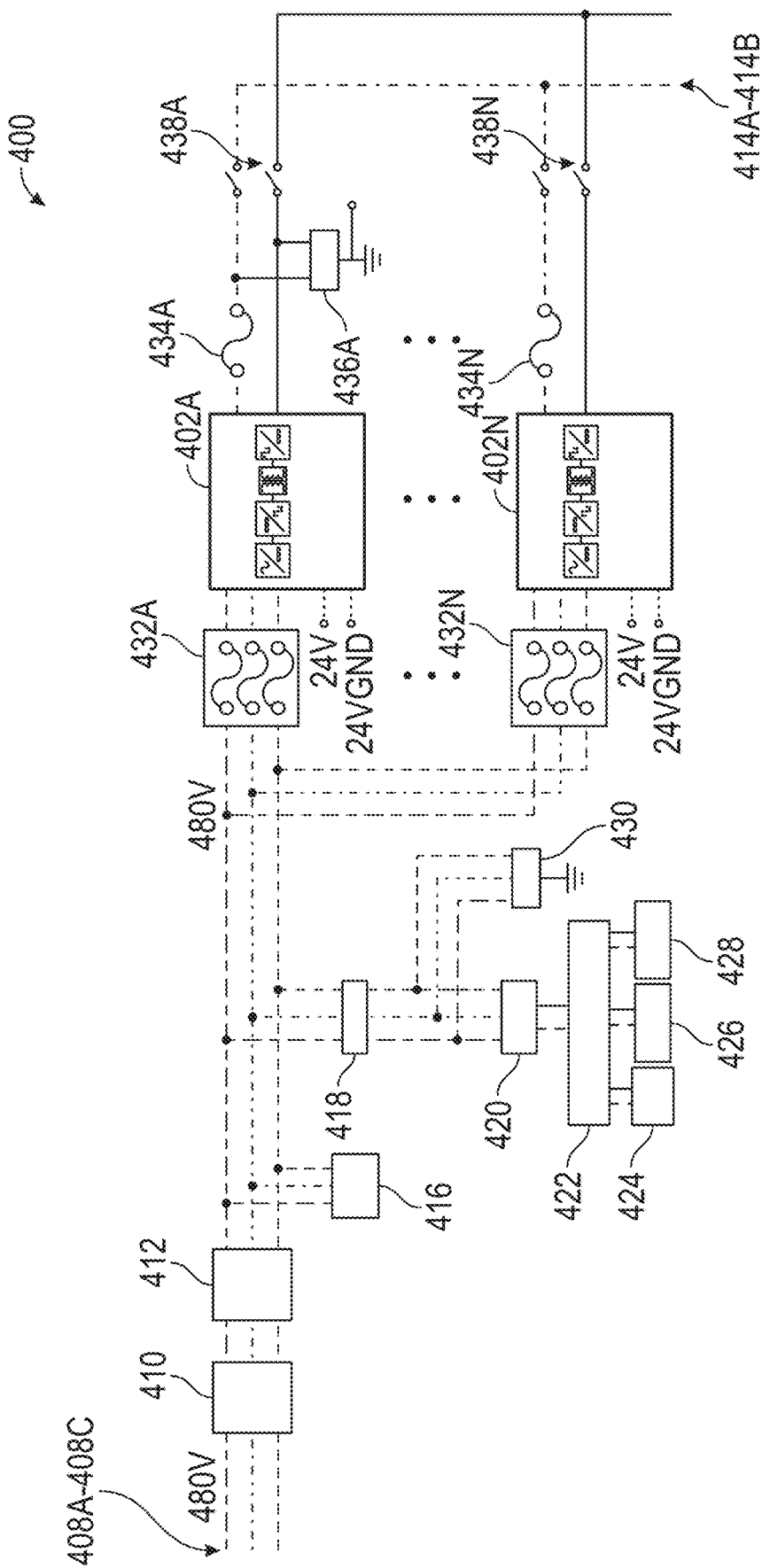
FIG. 4 illustrates an overview of an example system for charging an electric vehicle.

FIG. 4 illustrates an overview of an example system for charging an electric vehicle. In some embodiments, power cabinet 400 corresponds to power cabinet 100. In some embodiments, the power cabinet 400 comprises PEMs 402A-402N, which may be PEMs 102A-102N, power inputs 408A-408C, which may be power inputs 108A-108C, circuit breaker 410, which may be circuit breaker 110, EMI filter 412, which may be EMI filter 112, and power outputs 414A and 414B, which may be power outputs 114A and 114B.

In some embodiments, the power cabinet 400 comprises dispensers 416, circuit breakers 418, reference voltage supply 420, reference voltage distribution hub 422, master controller 424, heater 426, reference voltage load 428, fan switching mode power supply 430, PEM input protection circuitry 432A-432N (each electrically coupled to an input of a respective PEM), PEM output protection circuitry 434A-434N (each electrically coupled to an output of a respective PEM), surge protector 436A, and contactors 438A-438N (each corresponding to a respective PEM). In some embodiments, the dispensers 416 are configured to connect to the power cabinet 400 via a DC bus bar, and the power cabinet 400 is configured to transform an input AC voltage to a DC voltage and send energy to the dispensers 416. In some embodiments, the PEMs 402A-402N are configured to receive a reference voltage (e.g., 24 V). In some embodiments, the reference voltage is configured for control of low voltage electrical circuits of a respective PEM.

Figure 5:
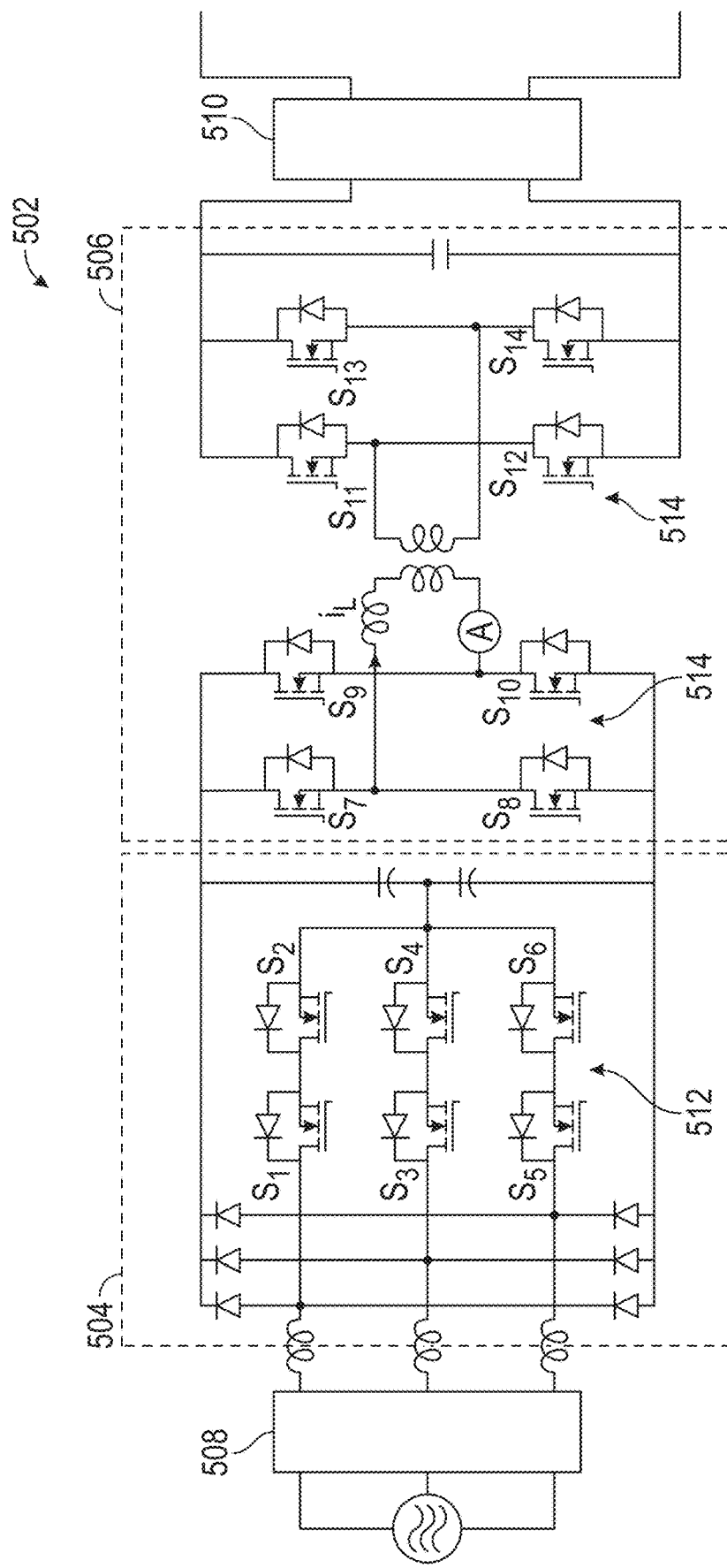
FIG. 5 illustrates an overview of an example PEM for charging an electric vehicle.

FIG. 5 illustrates an overview of an example PEM 502 for charging an electric vehicle. In some embodiments, PEM 502 corresponds to one or more of PEMs 102A-102N and/or PEM 402A-402N. In some embodiments, PEM 502 comprises AC-DC converter 504, DC-DC converter 506, and EMI filters 508 and 510. In some embodiments, AC-DC converter 504 corresponds to one or more of AC-DC converter 104A-104N, and DC-DC converter 506 corresponds to 106A-106N.

In some embodiments, the PEM 502 is configured to be switched at a frequency to provide a DC voltage for charging an electric vehicle. For example, the PEM 502 is configured to be switched at Fs1, fs, or FsN (e.g., for switching AC-DC converter 504, for switching DC-DC converter 506), and the PEM 502 is configured to provide a DC voltage to a power dispenser for charging an electric vehicle. In some embodiments, the PEM 502 comprises Silicon Carbide (SiC) MOSFETs (e.g., transistors 512, transistors 514), and a signal at the frequency for operating the PEM 502 is used to switch the SiC MOSFET devices. In some embodiments, the PEM 502 comprises insulated-gate bipolar transistor (IGBT) or Gallium Nitride Field Effect Transistors (GaNFET), and a signal at the frequency for operating the PEM 502 is used to switch these devices.

In some embodiments, the AC-DC converter 502 comprises a Vienna rectifier. In some embodiments, the Vienna rectifier is switched at Fs1, fs, or FsN. In some embodiments, the DC-DC converters 506 comprises a dual active bridge converter. In some embodiments, the dual active bridge converter is switched at Fs1, fs, or FsN. In some embodiments, an AC-DC converter and a DC-DC converter of a PEM are electrically coupled together. For example, as illustrated, AC-DC converter 504 is electrically coupled to DC-DC converter 506, and the AC-DC converter and DC-DC converter are switched at Fs1, fs, or FsN.

Although a specific circuit is described with respect to PEM 502, it is appreciated that the disclosed EMI mitigation operations may be performed for power converters comprising different circuitries.

Figure 6:
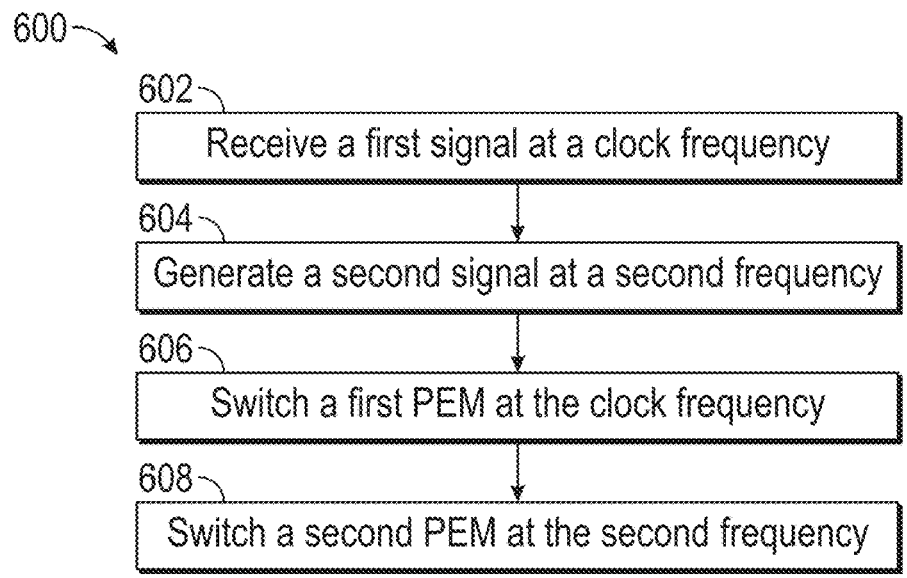
FIG. 6 illustrates an example method for operating a system for charging an electric vehicle.

FIG. 6 illustrates an example method 600 for operating a system for charging an electric vehicle. In some embodiments, the method 600 allows EMI generated by PEMs of the power cabinet 100 or power cabinet 400 for charging an electric vehicle to be averaged and reduced while minimizing costs for mitigating the EMI (e.g., no additional hardware may be required to mitigate the EMI, PEM redesign may not be required, additional EMI filter design may not be required). It is appreciated that steps of method 600 leverage features and advantages described with respect to FIGS. 1-5.

In some embodiments, the method 600 comprises receiving a first signal switching at a clock frequency, wherein the first signal is generated via a crystal oscillator (step 602). For example, as described with respect to FIGS. 1-5, the power cabinet receives a first signal at fs, and the first signal is generated via a crystal oscillator (e.g., a crystal oscillator of a respective PEM). In some embodiments, the clock frequency is 50 kHz.

In some embodiments, the method 600 comprises generating a second signal switching at a second frequency (step 604). For example, as described with respect to FIGS. 1-5, a second signal switching at Fs1 or FsN is generated based on fs. In some embodiments, an absolute difference between the clock frequency and the second frequency is greater than a noise sampling frequency. For example, as described with respect to FIGS. 1-5, an absolute difference (e.g., 200 Hz) between fs and Fs1 or fs and FsN is greater than a noise sampling frequency (e.g., 10 Hz).

In some embodiments, the method 600 comprises switching the first PEM at the clock frequency to provide a first DC voltage for charging a first electric vehicle (step 606). For example, as described with respect to FIGS. 1-5, PEM 102B is switched at fs to provide a DC voltage for charging an electric vehicle.

In some embodiments, the method 600 comprises switching the second PEM at the second frequency to provide a second DC voltage for charging the first vehicle or a second electric vehicle (step 608). For example, as described with respect to FIGS. 1-5, PEM 102A is switched at Fs1 to provide a DC voltage for charging an electric vehicle. As another example, as described with respect to FIGS. 1-5, PEM 102N is switched as FsN to provide a DC voltage for charging an electric vehicle.

In some embodiments, the first and second PEMs generate EMI noise, and a change of the EMI noise sampled at the noise sampling frequency is within a noise fluctuation threshold. For example, as described with respect to FIGS. 1-5, PEMs 102A, 102B, and 102N generate EMI noise (e.g., from the first signal and the second signal). Because an absolute difference between the clock frequency and the second frequency is greater than a noise sampling frequency, the slip frequency of the EMI noise is greater than the noise sampling frequency (e.g., more samples of the EMI noise may be taken), and a change of the EMI noise generated by the PEMs is within a noise fluctuation threshold (e.g., the EMI may be averaged). In some embodiments, the noise fluctuation threshold is 6-10 dB. For example, average signal 206 of EMI signal 208 is within the noise fluctuation threshold.

In some embodiments, method 600 advantageously allows EMI generated by the PEM signals (e.g., conduction emission) to be averaged and reduced while minimizing costs for mitigating the EMI (e.g., no additional hardware may be required to mitigate the EMI, PEM redesign may not be required, additional EMI filter design may not be required). By allowing the EMI to be averaged and reduced, power cabinet operational issues affecting high power delivery to an electric vehicle (e.g., resonance in the power cabinet, higher ripple current, higher and unstable conductive emission from 150 kHz-30 MHz) may be mitigated, and nearby devices susceptible to EMI at applicable bandwidths would be less affected. Furthermore, the disclosed methods allow the power cabinet to be compliant to interference requirements (e.g., FCC Class A).

In some embodiments, the method 600 comprises generating a third signal switching at a third frequency. For example, as described with respect to FIGS. 1-5, a second signal switching at Fs1 is generated for PEM 102A, and a third signal switching at FsN is generated for PEM 102N. In some embodiments, an absolute difference between the clock frequency and the third frequency is an integer multiple of the absolute difference between the clock frequency and the second frequency. For example, as described with respect to FIGS. 1-5, Δfs1 and ΔfsN are integer multiples of each other.

In some embodiments, the second frequency is in a range from a lower frequency bound to an upper frequency bound, and a center of the lower and upper frequency bounds is the clock frequency. For example, as described with respect to FIGS. 1-5, Fs1 and FsN are in a range from a lower frequency bound to an upper frequency bound, and the center of the lower and upper frequency bounds is fs.

In some embodiments, the method 600 comprises outputting, at a respective PEM, a voltage between 200V and 1000V. For example, as described with respect to FIGS. 1-5, the PEMs 102A-102N are configured to output a voltage between 200 V and 1000 V (e.g., by being driven at their respective operating frequency, as described herein).

In some embodiments, the power cabinet further comprises third to sixth PEMs. For example, as described with respect to FIGS. 1-5, the power cabinet comprises six PEMs. In some embodiments, the method 600 comprises generating third to sixth signals switching at third to sixth frequencies, respectively. In some embodiments, as described with respect to FIGS. 1-5, signals switching at fs, Fs1, Fs2, Fs4, Fs5, and Fs6 are generated for the respective PEMs. In some embodiments, an absolute difference between two of the clock and second to sixth frequencies is greater than the noise sampling frequency. For example, as described with respect to FIGS. 1-5, an absolute difference of any of two of fs, Fs1, Fs2, Fs4, Fs5, and Fs6 is greater than the noise sampling frequency, allow EMI generated by the PEMs to be averaged and reduced, as described herein.

In some embodiments, the second PEM comprises a Vienna rectifier, and the method 600 comprises switching the second PEM at the second frequency comprises switching the Vienna rectifier at the second frequency. For example, as described with respect to FIGS. 1-5, the PEM 102A comprises a Vienna rectifier, and the Vienna rectifier is switched at Fs1.

In some embodiments, the second PEM comprises a dual active bridge converter, and switching the second PEM at the second frequency comprises switching the dual active bridge converter at the second frequency. For example, as described with respect to FIGS. 1-5, the PEM 102A comprises a dual active bridge converter, and the dual active bridge converter is switched at Fs1.

In some embodiments, the second PEM comprises an AC-DC converter coupled to a DC-DC converter, and switching the second PEM at the second frequency comprises switching the AC-DC converter and the DC-DC converter at the second frequency. For example, as described with respect to FIGS. 1-5, the PEM 102A comprises an AC-DC converter 104A coupled to a DC-DC converter 106A, and the AC-DC converter 104A and the DC-DC converter 106A are switched at Fs1.

In some embodiments, the method 600 comprises receiving an indication of a presence of a third PEM in the power cabinet. For example, as described with respect to FIGS. 1-5, at a first time, Fs1 is determined based on detection of the presence of PEMs 102A and 102B in operation (e.g., PEM 102N is not in operation, PEM 102N has not been added to the power cabinet 100), and at a second time, at a second time, the power cabinet 100 detects the presence of PEM 102N (e.g., corresponding to FsN) in operation (e.g., PEM 102N is now operation, PEM 102N has been added to the power cabinet 100).

In some embodiments, the method 600 comprises in response to receiving the indication, updating the second signal to switch at a third frequency. In some embodiments, the third frequency is different than the second frequency, and an absolute difference between the clock frequency and the third frequency is greater than the noise sampling frequency. For example, as described with respect to FIGS. 1-5, Fs1 is updated to a different frequency, and Fs1 is updated such that absolute difference between Fs1, fs, and FsN are greater than the noise sampling frequency (e.g., Fs1 is updated such that the introduction of FsN allow EMI between PEMs 102A, 102B, and 102N to be mitigated as disclosed herein)

In some embodiments, switching the first PEM at the clock frequency and switching the second PEM at the second frequency comprise switching SiC MOSFETs. For example, as described with respect to FIGS. 1-5, the PEMs 102A and 102N comprise SiC MOSFETs, and the devices are switched at the respective frequencies, as described herein.

In some embodiments, the power cabinet comprises a second crystal oscillator configured to generate third signal switching at a second clock frequency. For example, as described with respect to FIGS. 1-5, the PEM 102A comprises a second crystal oscillator (e.g., different from the crystal oscillator of PEM 102B that is configured to generate the first signal switching the clock frequency). In some embodiments, the second crystal oscillator is configured to generate a third signal switching at a second clock frequency different from the first clock frequency. In some embodiments, an absolute difference between the first and second clock frequencies is not greater than the noise sampling frequency. For example, the absolute difference between fs and the second clock frequency (of the second crystal oscillator) is not greater than 10 Hz.

In some embodiments, the method 600 comprises forgoing generating the third signal. For example, as described with respect to FIGS. 1-5, because the absolute difference between fs and the second clock frequency (of the second crystal oscillator) is not greater than the noise sampling frequency, generation of the third signal at the second clock frequency may be forgone (e.g., to avoid generating EMI that may not be averaged). By forgoing generating the third signal, the plurality of PEMs 102A-102N may comprise a same PEM (e.g., each PEM comprises a crystal oscillator, but one of the crystal oscillator is used), reducing cost of designing and manufacturing different PEMs. In some embodiments, the method 600 comprises determining the second frequency based on a noise reduction parameter (e.g., based on an EMI requirement of the system).

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for operating a system for charging an electric vehicle including the particular steps of the method of FIG. 6, this disclosure contemplates any suitable method for operating a system for charging an electric vehicle including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
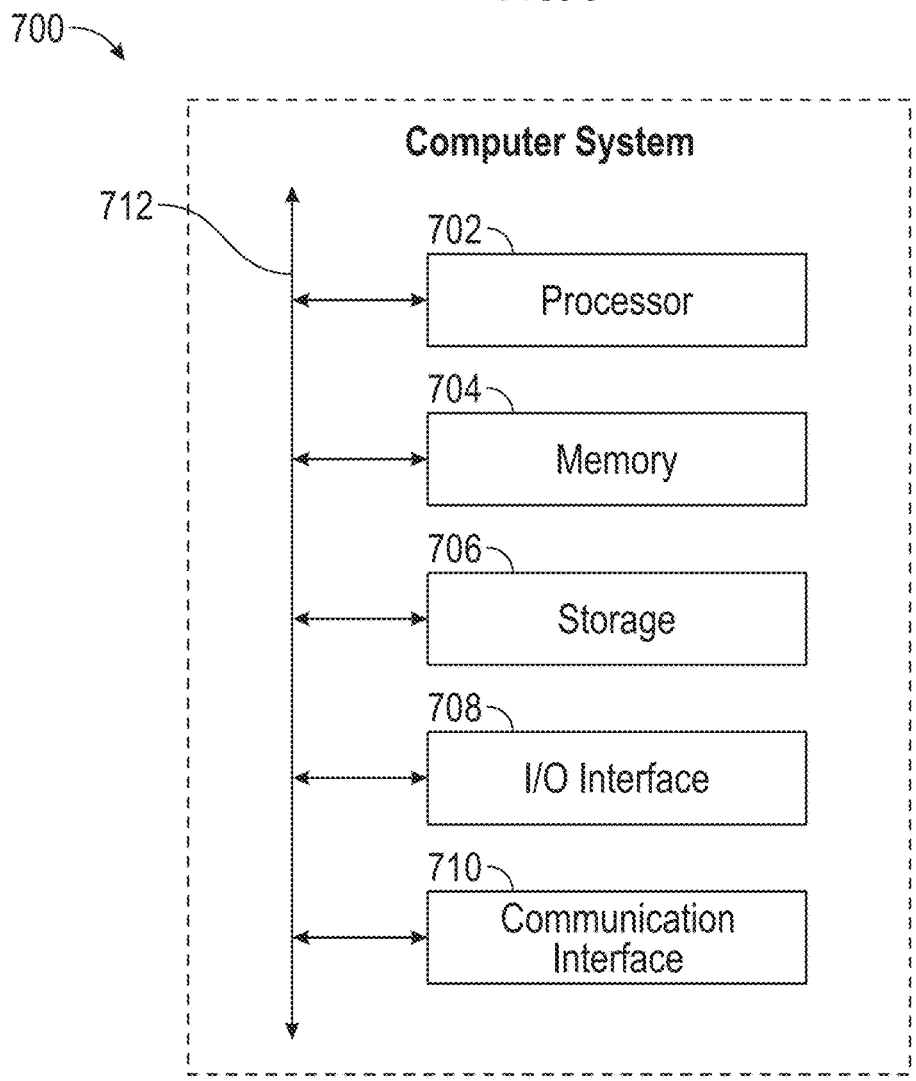
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

For example, the power cabinet 100 and/or the power cabinet 400 comprises one or more computer systems 700, and software running on the one or more computer systems for performing the disclosed electric vehicle charging operations. In some embodiments, one or more computer systems 700 communicate with the power cabinet 100 and/or the power cabinet 400 for providing instructions to the power cabinet for performing the disclosed electric vehicle charging operations.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes instructions in one or more internal registers or internal caches or in memory 704 (as opposed to storage 706 or elsewhere) and operates on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

In some embodiments, a system for charging an electric vehicle comprises a first power electronics module (PEM); a second PEM; and one or more processors configured to cause the system to perform a method comprising: receiving a first signal switching at a clock frequency, wherein the first signal is generated via an oscillator; generating a second signal switching at a second frequency, wherein an absolute difference between the clock frequency and the second frequency is greater than a noise sampling frequency; switching the first PEM at the clock frequency to provide a first direct current (DC) voltage for charging a first electric vehicle; and switching the second PEM at the second frequency to provide a second DC voltage for charging the first vehicle or a second electric vehicle, wherein: the first and second PEMs generate EMI noise, and a change of the EMI noise sampled at the noise sampling frequency is within a noise fluctuation threshold.

In some embodiments, the method further comprises generating a third signal switching at a third frequency, wherein an absolute difference between the clock frequency and the third frequency is an integer multiple of the absolute difference between the clock frequency and the second frequency.

In some embodiments, the second frequency is in a range from a lower frequency bound to an upper frequency bound; and a center of the lower and upper frequency bounds is the clock frequency.

In some embodiments, the clock frequency is 50 kHz.

In some embodiments, the method further comprises outputting, at a respective PEM, a voltage between 200V and 1000V.

In some embodiments, the noise fluctuation threshold is 6-10 dB.

In some embodiments, the system further comprises third to sixth PEMs, and the method further comprises generating third to sixth signals switching at third to sixth frequencies, respectively, wherein an absolute difference between two of the clock and second to sixth frequencies is greater than the noise sampling frequency.

In some embodiments, the system further comprises an EMI filter electrically coupled to an input of the system.

In some embodiments, the second PEM comprises a Vienna rectifier; and switching the second PEM at the second frequency comprises switching the Vienna rectifier at the second frequency.

In some embodiments, the second PEM comprises a dual active bridge converter; and switching the second PEM at the second frequency comprises switching the dual active bridge converter at the second frequency.

In some embodiments, the second PEM comprises an AC-DC converter coupled to a DC-DC converter; and switching the second PEM at the second frequency comprises switching the AC-DC converter and the DC-DC converter at the second frequency.

In some embodiments, the method further comprises receiving a 480 V AC input voltage.

In some embodiments, the method further comprises: receiving an indication of a presence of a third PEM of the system; and in response to receiving the indication, updating the second signal to switch at a third frequency, wherein: the third frequency is different than the second frequency; and an absolute difference between the clock frequency and the third frequency is greater than the noise sampling frequency.

In some embodiments, switching the first PEM at the clock frequency and switching the second PEM at the second frequency comprise switching SiC MOSFETs.

In some embodiments, the oscillator is a first crystal oscillator, and the system comprises a second crystal oscillator configured to generate third signal switching at a second clock frequency; the second clock frequency is different than the first clock frequency; and an absolute difference between the first and second clock frequencies is not greater than the noise sampling frequency.

In some embodiments, the method further comprises forgoing generating the third signal.

In some embodiments, the method further comprises determining the second frequency based on a noise reduction parameter.

In some embodiments, the absolute difference between the clock frequency and the second frequency is 3-5 times greater than the noise sampling frequency.

In some embodiments, a method for operating a system for charging an electric vehicle, wherein the system comprises a first PEM and a second PEM comprises: receiving a first signal switching at a clock frequency, wherein the first signal is generated via an oscillator; generating a second signal switching at a second frequency, wherein an absolute difference between the clock frequency and the second frequency is greater than a noise sampling frequency; switching the first PEM at the clock frequency to provide a first DC voltage for charging a first electric vehicle; and switching the second PEM at the second frequency to provide a second DC voltage for charging the first vehicle or a second electric vehicle, wherein: the first and second PEMs generate EMI noise, and a change of the EMI noise sampled at the noise sampling frequency is within a noise fluctuation threshold.

In some embodiments, a non-transitory computer readable storage medium stores one or more programs, the one or more programs comprising instructions, which when executed by a system for charging an electric vehicle with one or more processors and memory, cause the system to perform a method comprising: receiving a first signal switching at a clock frequency, wherein the first signal is generated via an oscillator; generating a second signal switching at a second frequency, wherein an absolute difference between the clock frequency and the second frequency is greater than a noise sampling frequency; switching a first PEM of the system at the clock frequency to provide a first DC voltage for charging a first electric vehicle; and switching a second PEM of the system at the second frequency to provide a second DC voltage for charging the first vehicle or a second electric vehicle, wherein: the first and second PEMs generate EMI noise, and a change of the EMI noise sampled at the noise sampling frequency is within a noise fluctuation threshold.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:
1. A system for charging an electric vehicle, comprising:
a first power electronics module (PEM);
a second PEM; and
one or more processors configured to cause the system to perform a method comprising:
receiving a first signal switching at a clock frequency, wherein the first signal is generated via an oscillator;
generating a second signal switching at a second frequency, wherein an absolute difference between the clock frequency and the second frequency is greater than a noise sampling frequency;
switching the first PEM at the clock frequency to provide a first direct current (DC) voltage for charging a first electric vehicle; and
switching the second PEM at the second frequency to provide a second DC voltage for charging the first vehicle or a second electric vehicle, wherein:
the first and second PEMs generate EMI noise, and
a change of the EMI noise sampled at the noise sampling frequency is within a noise fluctuation threshold.

2. The system of claim 1, wherein the method further comprises generating a third signal switching at a third frequency, wherein an absolute difference between the clock frequency and the third frequency is an integer multiple of the absolute difference between the clock frequency and the second frequency.

3. The system of claim 1, wherein:
the second frequency is in a range from a lower frequency bound to an upper frequency bound; and
a center of the lower and upper frequency bounds is the clock frequency.

4. The system of claim 1, wherein the clock frequency is 50 kHz.

5. The system of claim 1, wherein the method further comprises outputting, at a respective PEM, a voltage between 200V and 1000V.

6. The system of claim 1, wherein the noise fluctuation threshold is 6-10 dB.

7. The system of claim 1, further comprising third to sixth PEMs, wherein the method further comprises generating third to sixth signals switching at third to sixth frequencies, respectively, wherein an absolute difference between two of the clock and second to sixth frequencies is greater than the noise sampling frequency.

8. The system of claim 1, further comprising an EMI filter electrically coupled to an input of the system.

9. The system of claim 1, wherein:
the second PEM comprises a Vienna rectifier; and
switching the second PEM at the second frequency comprises switching the Vienna rectifier at the second frequency.

10. The system of claim 1, wherein:
the second PEM comprises a dual active bridge converter; and
switching the second PEM at the second frequency comprises switching the dual active bridge converter at the second frequency.

11. The system of claim 1, wherein:
the second PEM comprises an AC-DC converter coupled to a DC-DC converter; and switching the second PEM at the second frequency comprises switching the AC-DC converter and the DC-DC converter at the second frequency.

12. The system of claim 1, wherein the method further comprises receiving a 480 V AC input voltage.

13. The system of claim 1, wherein the method further comprises:
receiving an indication of a presence of a third PEM of the system; and
in response to receiving the indication, updating the second signal to switch at a third frequency, wherein:
the third frequency is different than the second frequency; and
an absolute difference between the clock frequency and the third frequency is greater than the noise sampling frequency.

14. The system of claim 1, wherein switching the first PEM at the clock frequency and switching the second PEM at the second frequency comprise switching SiC MOSFETs.

15. The system of claim 1, wherein:
the oscillator is a first crystal oscillator;
the system comprises a second crystal oscillator configured to generate third signal switching at a second clock frequency;
the second clock frequency is different than the first clock frequency; and
an absolute difference between the first and second clock frequencies is not greater than the noise sampling frequency.

16. The system of claim 15, wherein the method further comprises forgoing generating the third signal.

17. The system of claim 1, wherein the method further comprises determining the second frequency based on a noise reduction parameter.

18. The system of claim 1, wherein the absolute difference between the clock frequency and the second frequency is 3-5 times greater than the noise sampling frequency.

19. A method for operating a system for charging an electric vehicle, wherein the system comprises a first PEM and a second PEM, the method comprising:
receiving a first signal switching at a clock frequency, wherein the first signal is generated via an oscillator;
generating a second signal switching at a second frequency, wherein an absolute difference between the clock frequency and the second frequency is greater than a noise sampling frequency;
switching the first PEM at the clock frequency to provide a first DC voltage for charging a first electric vehicle; and
switching the second PEM at the second frequency to provide a second DC voltage for charging the first vehicle or a second electric vehicle, wherein:
the first and second PEMs generate EMI noise, and
a change of the EMI noise sampled at the noise sampling frequency is within a noise fluctuation threshold.

20. A non-transitory computer readable storage medium storing one or more programs, the one or more programs comprising instructions, which when executed by a system for charging an electric vehicle with one or more processors and memory, cause the system to perform a method comprising:
receiving a first signal switching at a clock frequency, wherein the first signal is generated via an oscillator;
generating a second signal switching at a second frequency, wherein an absolute difference between the clock frequency and the second frequency is greater than a noise sampling frequency;

switching a first PEM of the system at the clock frequency to provide a first DC voltage for charging a first electric vehicle; and switching a second PEM of the system at the second frequency to provide a second DC voltage for charging the first vehicle or a second electric vehicle, wherein:

the first and second PEMs generate EMI noise, and a change of the EMI noise sampled at the noise sampling frequency is within a noise fluctuation threshold.

* * * * *